Oct. 20, 1953   W. C. PROEHL   2,655,944
HEATING TUBE FOR DEEP FAT FRYERS
Filed June 7, 1950   2 Sheets-Sheet 1

INVENTOR.
William C. Proehl.
BY
Thiess, Olson & Mecklenburger
Attys

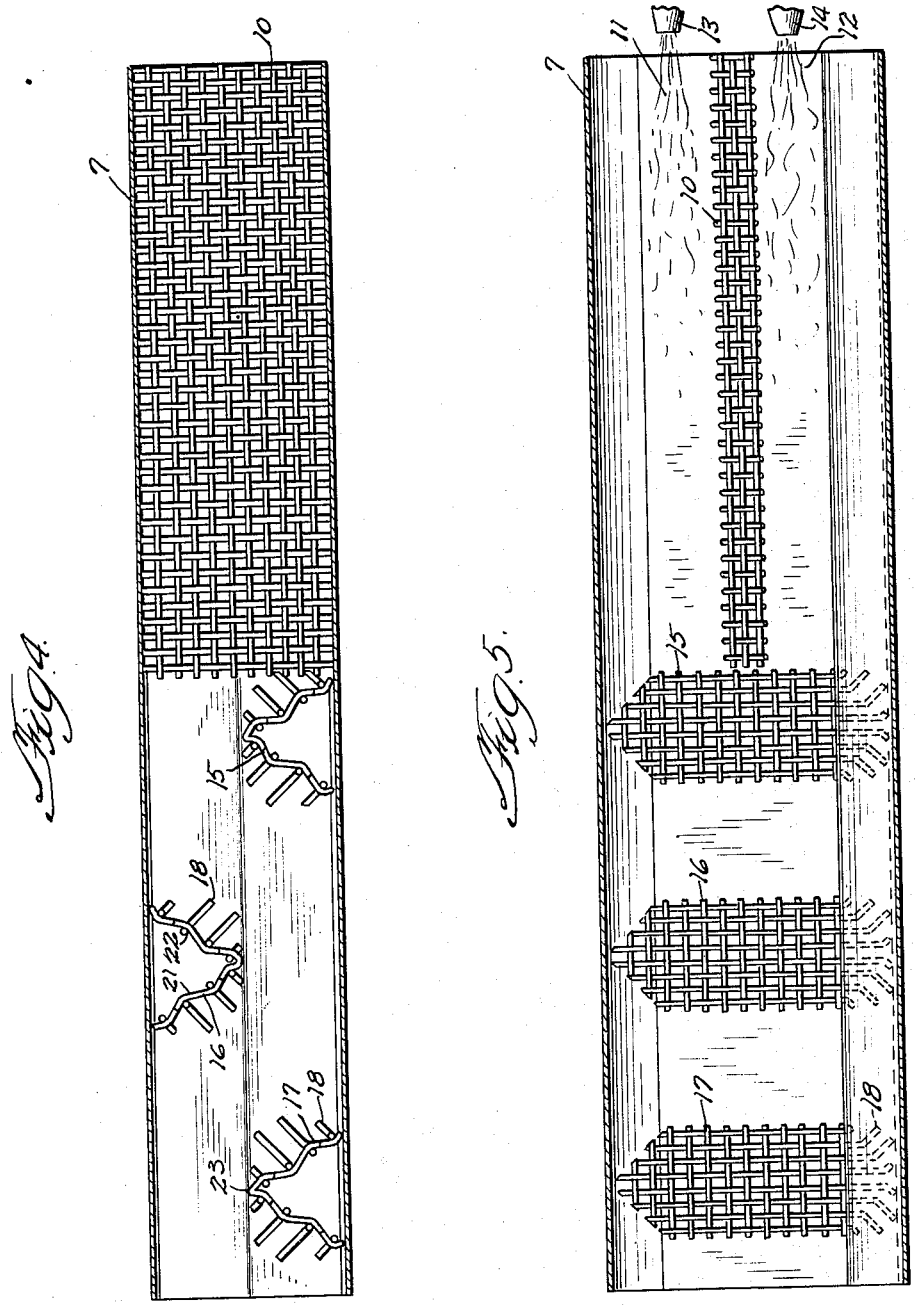

Patented Oct. 20, 1953

2,655,944

UNITED STATES PATENT OFFICE 2,655,944

HEATING TUBE FOR DEEP FAT FRYERS

William C. Proehl, Chicago, Ill.

Application June 7, 1950, Serial No. 166,663

7 Claims. (Cl. 138—38)

The present invention relates to improved heating tubes for deep fat fryers and the like.

In preparing various kinds of fried foods, such as French fried potatoes, chicken, shrimp, doughnuts, etc., it has become the regular practice in restaurants and hotel kitchens to employ relatively large containers capable of holding considerable quantities of a melted fat or of an oil which is kept heated to frying temperatures, around 400–430° F.

In order to avoid too great chilling of the heated fat or oil when articles to be fried are placed therein, considerably more of the fat or oil must be in heated condition, and it is likewise important to have highly efficient means for supplying heat to the fat or oil as heat is used up in the frying operation.

It is usually the custom to keep enough heat input to keep the fat or oil at about the frying temperature and when frying begins to rapidly increase the heat input as by turning up the source of heat. The latter almost universally consists of gas or oil burners which deliver a relatively large volume of heated combustion gases to the tank by the expedient of having the gases traverse a series or multiple of flues which pass through the tank or cooking vessel.

It is one of the primary objects of the present invention to provide more efficient heat-transfer means for deep fat fryers.

It is a further object of the present invention to provide baffles made of a highly heat-resistant material, positioned within the heating tubes through which the hot gases pass so that, as these baffles attain visible red heat, they will act as radiant elements to radiate heat to the walls of the heating tubes.

It is a further object to make these baffles in the form of a wire-mesh network, so that they may abstract heat from the heating gas most effectively.

The present invention is illustrated by two sheets of drawings, showing only such details as are required for a proper understanding of the principles of the invention. In these drawings:

Fig. 4 is a horizontal longitudinal section through the tube along line 4—4 of Fig. 1 and shows the elongated first baffle in top plan view; and Fig. 5 is a vertical longitudinal section along the line 5—5 of Fig. 1, and also indicates the burners used to supply hot combustion gases to the tube.

Figure 1:
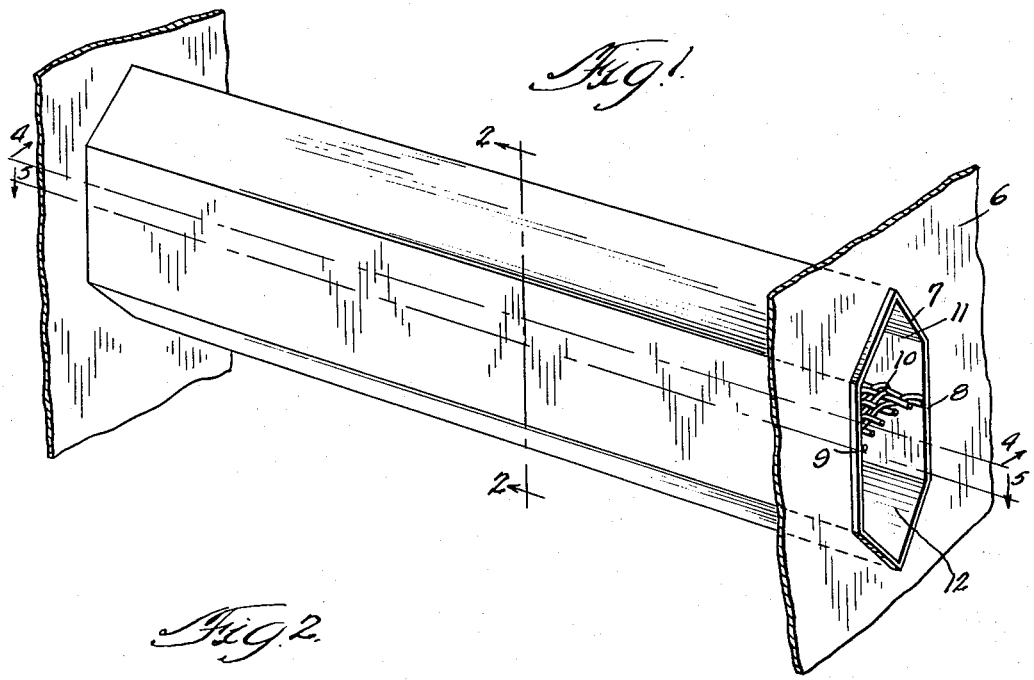
Figure 1 is a perspective view of a heating tube containing the baffles above mentioned.

In order to obtain the maximum amount of heat from the flame and combustion gases of the burners, woven wire baffles are placed in a heating tube which is placed similarly to the fire tubes of a steam boiler. The wire is preferably of an alloy which will withstand repeated heating to red heat without appreciable oxidation or weakening. Accordingly, so-called "Nichrome" wire was selected. This has been commercially available for many years and has the approximate composition of 60% nickel, 15% chromium, less than 0.1% carbon, less than 0.3% manganese, about 1.3% silicon, and the rest iron. It has been used primarily as for electrical heating elements. In the present instance, however, it is used both as a heat absorber as well as heat radiator.

Thus in the walls 6 of a suitable tank intended for the reception of cooking or frying fat or oil, there are placed tubes 7, one of which only is shown, but it is to be understood that there may be a plurality of them. This tube 7 is preferably made polygonal in cross section, and in the embodiment illustrated is hexagonal, with the two vertically extending opposed sides 8 and 9 being longer than any of the other four.

Extending into the tube for about one-half its extent is a horizontal dividing baffle 10 made of Nichrome wire-mesh. This is slightly wider than the inside diameter of the tube 7 and is bowed upwardly and sprung into the tube, thereby providing an upper 11 as well as a lower passageway 12. As can be seen from Fig. 5, two burners 13 and 14 serve to inject flames and the resultant products of combustion into the two respective spaces 11 and 12 and, as a result of the high temperature of these flames, the longitudinal baffle 10 will become red hot and hence will strongly radiate heat to the six sides of the tube 7. These sides will thus be highly heated, and as the tubes are made of metal, such as stainless steel, Monel metal, etc., they will readily conduct heat to the fat or oil.

As the temperature of the gases drops, the heating effect becomes lessened. Therefore, the rest of the tube 7 is fitted with a number of vertically extending bent Nichrome wire mesh baffles 15, 16 and 17. As shown in Figs. 4 and 5, the baffles may be three in number, and comprise attaching portions 18 which are in contact with the two lower sides 19 and 20 of the tube 7, and are preferably spot-welded thereto. The baffles themselves consist of two halves 21 and 22 and bent at about a 30° angle at the apexes 23 of the baffles. While one baffle is on one side of the tube, the next one is on the other side, and the next one on the same side as the first one. Of course, there may be as many as desired, but they alternate as to the sides upon which they are installed. These upright baffles likewise serve to absorb heat from the hot gases and will radiate this heat to the sides of the tube.

Figure 2:
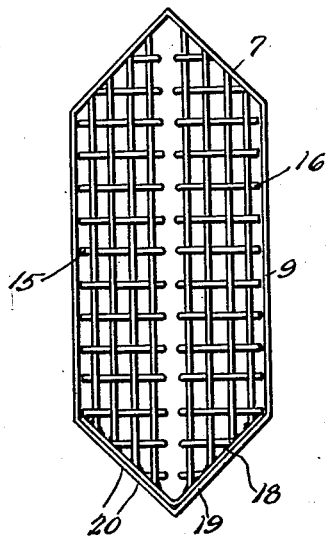
Fig. 2 is a vertical section through the heating tube along line 2—2 of Fig. 1 and shows a part of two of the vertical baffles.
Figure 3:
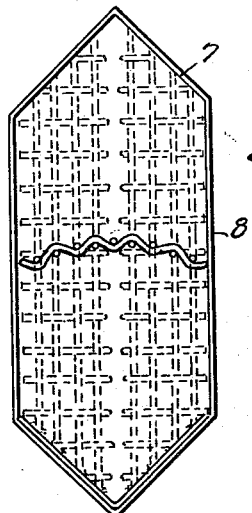
Fig. 3 is an end view of the tube shown in Fig. 1.

The result will be a most efficient utilization of the heat of the burners. In actual use almost immediately after the burners are turned on and lit, a violent series of thermal convection currents will be set up in the oil adjacent the outer walls of the tubes so that local overheating and charring of the fat or oil will be avoided. This is schematically illustrated in Fig. 2 by the arrows and flow lines.

The shape of the heating tubes, plus the rapid emission of heat radiations from the nickel-chromium alloy mesh-work, enables a much more efficient transmission of heat to the fat or oil. Thermal currents, upwardly directed, are set up which carry the radiated heat away so fast that burning of the fat or oil is avoided, fresh oil continually coming in contact with the tubes to absorb the available heat energy. It was found that round tubes heated either by gas or electricity were limited as to the heat input, in terms of B. t. u. to a heat discharge not greater than the equivalent of ten watts per square inch of surface heating area, while with the construction of the present invention a heat-discharge as great as 45 watts per square inch of heating surface is possible. It is believed that the radiant heat discharge is mainly responsible for this improvement.

As Nichrome wire resists destruction by heat for a long time, the baffles will last almost indefinitely, while if they were made of ordinary soft iron or steel, they would quickly succumb to the oxidation to which they would unavoidably be subjected, because the combination gases while low in available oxygen, nevertheless draw in air by their aspirating effect.

The present invention has been found to be very useful and effective. It will be considered as within the scope of the present invention to make the baffles from other than wire mesh, such as expanded Nichrome sheets, perforated or slitted Nichrome sheets or even solid sheets; although the better results are obtained from wire mesh, as illustrated.

Applicant claims:

1. In heating tubes adapted for heating liquids the combination of a horizontally disposed tube for traversal of highly heated gases, and heat-radiating elements therein comprising a horizontally disposed mediate mesh work and a plurality of vertically positioned baffles of mesh work, the said mesh work being made of a nickel-chromium-iron alloy, said baffles being arranged in staggered relationship in said tube by being secured alternately to opposite sides of the tube and extending toward the opposed wall thereof.

2. In heating tubes adapted for heating liquids the combination of a horizontally disposed tube for traversal of highly heated gases, and heat-radiating elements therein comprising a horizontally disposed mediate mesh work and a plurality of vertically positioned baffles of mesh work, said mesh work being made of a nickel-chromium-iron alloy, said horizontally disposed mesh work extending medially through about one-half of the length of the tube and the baffles being arranged in staggered relationship in the other half of said tube by being secured alternately to opposite sides of the tube and extending about to the center thereof.

3. In heating tubes adapted for heating liquids the combination of a horizontally disposed tube for traversal of highly heated gases, and heat-radiating elements therein comprising a horizontally disposed mediate mesh work and a plurality of vertically positioned baffles of mesh work, said mesh work being made of a nickel-chromium-iron alloy, said horizontally disposed mesh work extending medially through about one-half of the length of the tube and the baffles being arranged in staggered relationship in the other half of said tube by being secured alternately to opposite sides of the tube and extending about to the center thereof, the horizontally disposed mesh work being at the portion of the tube receiving the gases.

4. A heating tube for deep fat fryers and the like comprising a substantially hexagonal tube having two opposed sides longer than the other four, a nickel-chromium-iron alloy mesh work extending longitudinally for about one-half the length of the tube and positioned so as to extend across said tube, and a plurality of transversely extending nickel-chromium-iron alloy mesh-work baffles staggeredly positioned on the other half of said tube and bent back upon themselves at about a 30° angle and secured alternately to opposite sides of said tube and extending toward the opposed wall thereof, said nickel-chromium-iron alloy having high heat emissivity whereby heat abstracted from hot gases traversing said tubes will be radiated to the sides thereof, thereby increasing the efficiency of the heating tube.

5. A heating tube for deep fat fryers comprising a horizontally disposed polygonal tube arranged for the passage of highly heated gases, and having an inlet and an outlet end, a heat-radiating Nichrome wire-mesh horizontally and longitudinally extending baffle extending from the inlet end for a portion into said tube, thereby dividing it into an upper and a lower passageway, and a plurality of vertically extending Nichrome wire-mesh baffles in the rest of the tube, arranged alternately on one and the other side of the median plane of said tube.

6. A heating tube for the transmission of heat to a liquid comprising a tube arranged for the passage therethrough of highly heated gases, and having an inlet and an outlet end, a heat-radiating foraminous longitudinal baffle extending from the inlet end for a portion into said tube, thereby dividing it into two parallel longitudinal passageways, and a plurality of transverse foraminous baffles in the further portion of said tube secured alternately to opposite sides thereof and extending toward the opposite wall to that to which they are attached.

7. A heating tube for the transmission of heat to a liquid comprising a tube arranged for the passage therethrough of highly heated gases, and having an inlet and an outlet end, a heat-radiating wire-mesh longitudinal baffle extending from the inlet end for a portion into said tube, thereby dividing it into two parallel longitudinal passageways, and a plurality of transverse wire-mesh baffles in the further portion of said tube secured alternately to opposite sides thereof and extending substantially to the median longitudinal plane of said tube.

WILLIAM C. PROEHL.

References Cited in the file of this patent
UNITED STATES PATENTS

| Number | Name | Date |
|---|---|---|
| 2,400,653 | O'Dowd | May 21, 1946 |
| 2,424,612 | Gunter | July 29, 1947 |

FOREIGN PATENTS

| Number | Country | Date |
|---|---|---|
| 11,959 | Great Britain | June 19, 1895 |